United States Patent [19]

Shibahata

[11] Patent Number: 5,409,425
[45] Date of Patent: * Apr. 25, 1995

[54] TORQUE DISTRIBUTING MECHANISM IN DIFFERENTIAL

[75] Inventor: Yasuji Shibahata, Wako, Japan

[73] Assignee: Honda Giken Kogyo Kabushiki Kaisha, Tokyo, Japan

[ * ] Notice: The portion of the term of this patent subsequent to Feb. 7, 2012 has been disclaimed.

[21] Appl. No.: 103,123

[22] Filed: Aug. 9, 1993

Related U.S. Application Data

[62] Division of Ser. No. 832,847, Feb. 10, 1992.

[30] Foreign Application Priority Data

Mar. 18, 1992 [JP] Japan .................................. 6-88174

[51] Int. Cl.⁶ .................. F16H 3/72; F16H 37/08; F16H 47/04
[52] U.S. Cl. .................................. 475/5; 475/72; 475/150; 475/219
[58] Field of Search ............. 475/5, 6, 7, 9, 10, 475/1, 2, 3, 4, 18, 19, 21, 27, 28, 72, 88, 89, 150, 219, 221, 252, 330, 225, 249; 180/287, 248, 249, 338, 345, 337, 364, 369

[56] References Cited

U.S. PATENT DOCUMENTS

| | | | |
|---|---|---|---|
| 4,633,735 | 6/1987 | Sakurai et al. | 475/2 O R |
| 4,729,259 | 3/1988 | Lanzer | 475/89 X |
| 4,819,512 | 4/1989 | Azuma et al. | 475/6 X |
| 4,848,186 | 7/1989 | Dorgan et al. | 475/28 X |
| 4,907,473 | 3/1990 | Fujitani et al. | 475/252 X |
| 5,071,392 | 12/1991 | Stall et al. | 475/150 O R |
| 5,127,887 | 7/1992 | Nuttall | 475/2 O R |

FOREIGN PATENT DOCUMENTS

| | | | |
|---|---|---|---|
| 3239223 | 6/1984 | Germany | 475/72 |
| 0153844 | 6/1989 | Japan | 475/5 |
| 0216145 | 8/1989 | Japan | 475/5 |
| 0203050 | 8/1990 | Japan | 475/5 |

Primary Examiner—Dirk Wright
Assistant Examiner—Khoi O. Ta
Attorney, Agent, or Firm—Armstrong, Westerman, Hattori, McLeland & Naughton

[57] ABSTRACT

A torque distributing differential for distributing torque from an input element to two output elements and including a first planetary carrier connected to one of the two output elements of the differential and a sun gear coupled to the other of the two output elements. A second planetary carrier of a planetary gear type torque distributing mechanism coupled to the other of the two output elements. An external tooth gear of a ring gear of the torque distributing mechanism and an external tooth gear of the first planetary carrier being operatively connected to each other with a predetermined reduction ratio through a pair of spur gears, so that the sun gear is rotatably driven by a motor.

8 Claims, 7 Drawing Sheets

TORQUE DISTRIBUTING MECHANISM IN DIFFERENTIAL

This is a division of application Ser. No. 07/832,847, filed Feb. 10, 1992.

BACKGROUND OF THE INVENTION

1. Field of the Invention

This invention generally relates to a torque distributing mechanism in a differential including a single input element and two output elements for distributing torque applied to the input element of the differential to the two output elements at a predetermined proportion.

2. Description of the Prior Art

A differential in a power transmitting system of an automobile is constructed such that a difference in rotational speed developed between left and right wheels, during turning of the automobile, is absorbed, and torque of an engine is distributed to the left and right wheels at an appropriate proportion. However, a common differential is operated by difference between loads applied to the left and right wheels. Therefore, such differential is accompanied by a problem that if one of the wheels gets on a road surface of small friction coefficient and slips, the amount of torque transmitted to the other wheel may be reduced, or transmission of torque may be cut off.

In order to solve the above problem, there is a conventionally-proposed torque distributing mechanism in a differential, designed to positively control the differential on the basis of rotational angle of a steering wheel and vehicle speed to distribute torque suitable for the current operational condition to left and right wheels.

FIG. 7 illustrates the structure of such prior art torque distributing mechanism in the differential. Referring to FIG. 7, propeller shaft 01, connected to an engine E and transmission M and driven thereby, is connected to central shaft 04 through bevel gear 02 and bevel gear 03. Right shaft $5_R$ for driving right wheel $W_R$ and left shaft $5_L$ for driving left wheel $W_L$ are coaxially disposed on laterally opposite sides of central shaft 04. Right differential $D_R$ is positioned between central shaft 04 and right shaft $5_R$, and left differential $D_L$ is positioned between central shaft 04 and left shaft $5_L$.

Both of differentials $D_R$ and $D_L$ are planetary gear types and comprised of planetary carriers $6_R$ and $6_L$ secured to right and left shafts $5_R$ and $5_L$, respectively, planetary gears $7_R$ and $7_L$ rotatably carried on planetary carrier $6_R$ and $6_L$, respectively, a pair of right and left sun gears $8_R$ and $8_L$ secured to central shaft 04 and meshed with planetary gears $7_R$ and $7_L$, respectively, and a pair of right and left ring gears $9_R$ and $9_L$ meshed with planetary gears $7_R$ and $7_L$, respectively. A pair of left and right bevel gears $10_R$ and $10_L$ formed, integrally, with right and left ring gears $9_R$ and $9_L$ are meshed with common bevel gear 013 driven through reducer 012 by motor 011.

With the torque distributing mechanism having the above structure, when torque transmitted to central shaft 04 is transmitted equally to right and left wheels $W_R$ and $W_L$ through differentials $D_R$ and $D_L$, right and left ring gears $9_R$ and $9_L$, i.e., right and left bevel gears $10_R$ and $10_L$ are not rotated. If a difference is developed between loads applied to right and left wheels $W_R$ and $W_L$, however, a difference in rotational speed is intended to be developed between right and left shafts $5_R$ and $5_L$, with the result that a difference in rotational speed is also developed between right and left ring gears $9_R$ and $9_L$. Therefore, if a difference in rotational speed is positively provided to right and left bevel gears $10_R$ and $10_L$, i.e., to right and left ring gears $9_R$ and $9_L$ through common bevel gear 013 by motor 011, the proportion of distribution of torque transmitted from central shaft 04 to right and left shafts $5_R$ and $5_L$ can be controlled.

In the above prior art torque distributing mechanism, however, the pair of right and left bevel gears $10_R$ and $10_L$ for providing a difference in rotational speed to right and left ring gears $9_R$ and $9_L$ and common bevel gear 013 meshed with the pair of right and left bevel gears $10_R$ and $10_L$ are indispensable. This results in a problem of increase in axial size of the torque distributing mechanism.

SUMMARY OF THE INVENTION

It is an object of the present invention to provide a reduction in size of the torque distributing mechanism in the differential by eliminating bevel gears.

To achieve the above object, in a first feature of the present invention there is provided a torque distributing mechanism in a differential including a single input element and two output elements for distributing torque applied to the input element of the differential to the two output elements at a predetermined proportion, wherein the torque distributing mechanism includes a drive source and a planetary gear mechanism which is comprised of a ring gear, a sun gear, and a planetary carrier carrying a planetary gear meshed with the ring gear and the sun gear, the planetary carrier being coupled to one of the output elements, the ring gear being connected to the other output element through a spur gear means, and the sun gear being connected to the drive source.

According to the first feature, the differential and the planetary gear mechanism of the torque distributing mechanism are interconnected through the spur gear means which can have a small dimension in an axial direction of the torque distributing mechanism. Therefore, it is possible to reduce the size of the torque distributing mechanism, as compared with the prior art torque distributing mechanism using bevel gears whose rotary shafts lie perpendicular to the aforementioned axial direction.

In addition to the first feature, the present invention has a second feature that the differential is comprised of a ring gear, a sun gear, and a planetary carrier carrying a planetary gear meshed with the ring gear and the sun gear of the differential.

According to the second feature, no bevel gear is required, because the differential is formed into a planetary gear type comprised of a ring gear, a sun gear, and a planetary carrier carrying a planetary gear meshed with the ring gear and the sun gear. This makes it possible to provide a reduction in axial size of the torque distributing mechanism, as compared with the case where a bevel gear type differential is used.

In addition to the first feature, the present invention has a third feature that the drive source and the sun gear are interconnected through a transmitting means adapted to restrain the rotation of the sun gear, when power is being transmitted from the sun gear to the drive source.

According to the third feature of the present invention, an excessive load is prevented from being applied to the drive source from the sun gear side, because the transmission of power from the sun gear of the planetary gear mechanism back to the drive source is restrained. This results in an ability to use a drive source which is of a small-sized, lightweight and small-output type.

Additionally, the present invention has a fourth feature that the drive source is disposed coaxially with a rotary shaft of the sun gear and this feature ensures reduction in radial size of the torque distributing mechanism.

The above and other objects, features and advantages of the invention will become more apparent from a consideration of the following description of the preferred embodiments, taken in conjunction with the accompanying drawings.

DESCRIPTION OF THE PREFERRED EMBODIMENTS

The present invention will now be described by way of embodiments in connection with the accompanying drawings.

Figure 1:
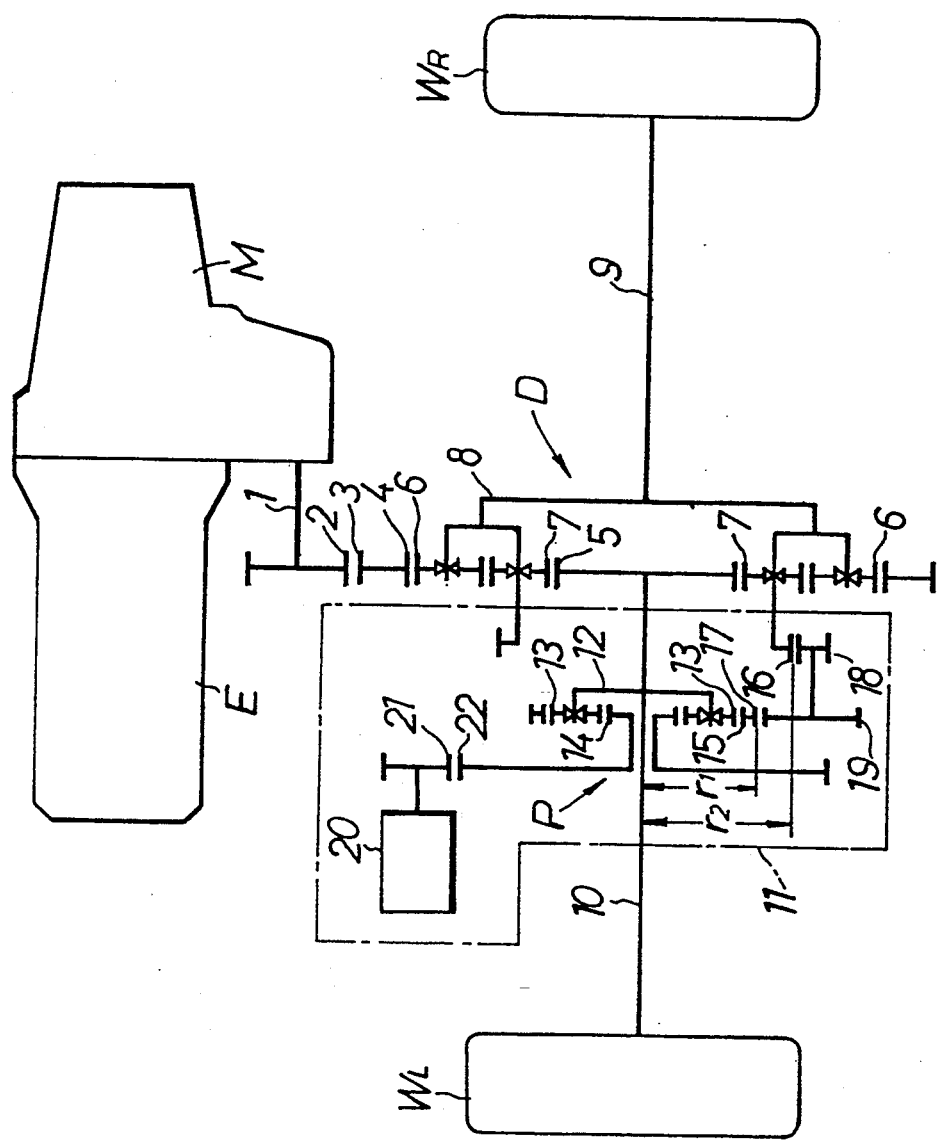
FIG. 1 is a diagram illustrating a torque distributing mechanism in a differential according to a first embodiment of the present invention.

FIG. 1 is a diagram illustrating a torque distributing mechanism in a differential or a differential gear apparatus according to a first embodiment of the present invention, applied to a front engine and front drive vehicle. As shown in FIG. 1, transmission M is connected to engine E horizontally mounted in a vehicle body, and differential input shaft 1, which is an output shaft of transmission M, includes input gear 2 for transmitting a driving force to planetary gear type differential D.

The differential D is comprised of ring gear 4 having, around its outer periphery, external tooth gear 3 meshed with input gear 2 of differential input shaft 1, sun gear 5 coaxially disposed within ring gear 4, and planetary carrier 8 which carries outer planetary gear 6 meshed with ring gear 4 and inner planetary gear 7 meshed with sun gear 5, the gears 6 and 7 being in a meshed relation to each other. In differential D, ring gear 4 serves as an input element, and planetary carrier 8 serving as one output element connected to right wheel $W_R$ through right shaft 9, while sun gear 5 serving as the other output element connected to left wheel $W_L$ through left shaft 10.

The structure of torque distributing mechanism 11, as described below, distributes torque applied from ring gear 4, as an input element of differential D, to planetary carrier 8 and sun gear 5 as two output elements at a predetermined proportion.

Torque distributing mechanism 11 includes planetary gear mechanism P. Planetary gear 13, on planetary carrier 12 coupled to left shaft 10, is meshed with sun gear 14 rotatably carried on left shaft 10. Planetary gear 13 is also meshed with ring gear 15 disposed around an outer periphery of planetary carrier 12. External tooth gear 16, integrally formed with planetary carrier 8 of differential D and external tooth gear 17 formed on ring gear 15 of planetary gear mechanism P are, respectively, meshed with pinions 18 and 19, as a pair of spur gears, integrally formed, thereby interconnecting differential D and planetary gear mechanism P.

If the numbers of teeth of planetary carrier 12, sun gear 4 and ring gear 15 of planetary gear mechanism P are represented as $Z_C$, $Z_S$ and $Z_R$, respectively and the rotational speed of each of them is represented as $\omega_C$, $\omega_S$ and $\omega_R$, respectively, and if sun gear 14 is fixed (i.e., $\omega_S = 0$), the following formula applies:

$$\omega_R = \omega_C \times (1 + Z_S/Z_R) \qquad (1)$$

If the case where right and left wheels $W_R$ and $W_L$ are rotated at the same speed is considered, the rotational speed of planetary carrier 12 of planetary gear mechanism P rotated in unison with left wheel $W_L$ is $\omega_C$, as described above, and the rotational speed of planetary carrier 8 of differential D, rotated in unison with right wheel $W_R$ which is rotated at the same speed as left wheel $W_L$ is also $\omega_C$. The rotational speed $\omega_R$ of ring gear 15 driven by planetary carrier 12 of planetary gear mechanism P is represented by $\omega_C \times (1 + Z_S/Z_R)$ according to formula (1), above.

Thus, in order to permit right and left wheels $W_R$ and $W_L$ to be rotated at the same speed $\omega_C$, it is necessary to operatively connect planetary carrier 8 of differential D and ring gear 15 of planetary gear mechanism P with each other by the pair of pinions 18 and 19, such that the rotational speed of planetary carrier 8 is $\omega_C$, and the rotational speed of ring gear 15 is $\omega_C \times (1 + Z_S/Z_R)$. To this end, radius $r_1$ of external tooth gear 17, formed on ring gear 15, and radius $r_2$ of external tooth gear 16, formed on planetary carrier 8, may be set to meet the following relation:

$$r_2/r_1 = 1 + (Z_S/Z_R) \qquad (2)$$

Planetary gear mechanism input gear 22, formed integrally with sun gear 14 of planetary gear mechanism p, is rotatably driven by pinion 21 of electric motor 20 driven on the basis of a rotational angle of a steering wheel for the vehicle, vehicle speed, and the like.

The operation of the first embodiment of the present invention, having the above-described construction, is described below.

Motor 20 is maintained in a stopped state during a straight travelling of the vehicle, and sun gear 14 of planetary gear mechanism P, connected to pinion 21 of motor 20 through planetary gear mechanism input gear 22, is fixed. At this time, planetary carrier 8 of differential D and planetary carrier 12 of planetary gear mechanism P are operatively connected to each other, at a predetermined gear ratio, through ring gear 15, external tooth gear 17, pinion 19, pinion 18 and external tooth gear 16, all as described above. Therefore, the rotational speeds of planetary carriers 8 and 12, i.e., the rotational speeds of planetary carrier 8 and sun gear 5, which are a pair of output elements of differential D are forcedly matched to each other, so that right and left wheels $W_R$ and $W_L$ are rotated at the same speed. If the steering wheel is operated to turn the vehicle, a required difference in rotational speed between right and left wheels $W_R$ and $W_L$ is calculated on the basis of the steering angle of the steering wheel and the vehicle speed, so that motor 20 is driven in a direction and at a speed corresponding to such difference in rotational speed. As a result, sun gear 14 of planetary gear mechanism P is rotated, and a predetermined difference is developed between the rotational speeds of planetary carriers 8 and 12, i.e., between the rotational speeds of planetary carrier 8 and sun gear 5 of differential D. Torque transmitted from transmission M to ring gear 4 of differential D is transmitted to left and right wheels $W_L$ and $W_R$ at a predetermined proportion which is determined by the rotational direction and the rotational speed of motor 20.

As compared with the prior art torque distributing mechanism using bevel gears, the axial size of the torque distributing mechanism can be reduced, because differential D and planetary gear mechanism P are interconnected by pinions 18 and 19 each comprised of a spur gear.

Figure 2:
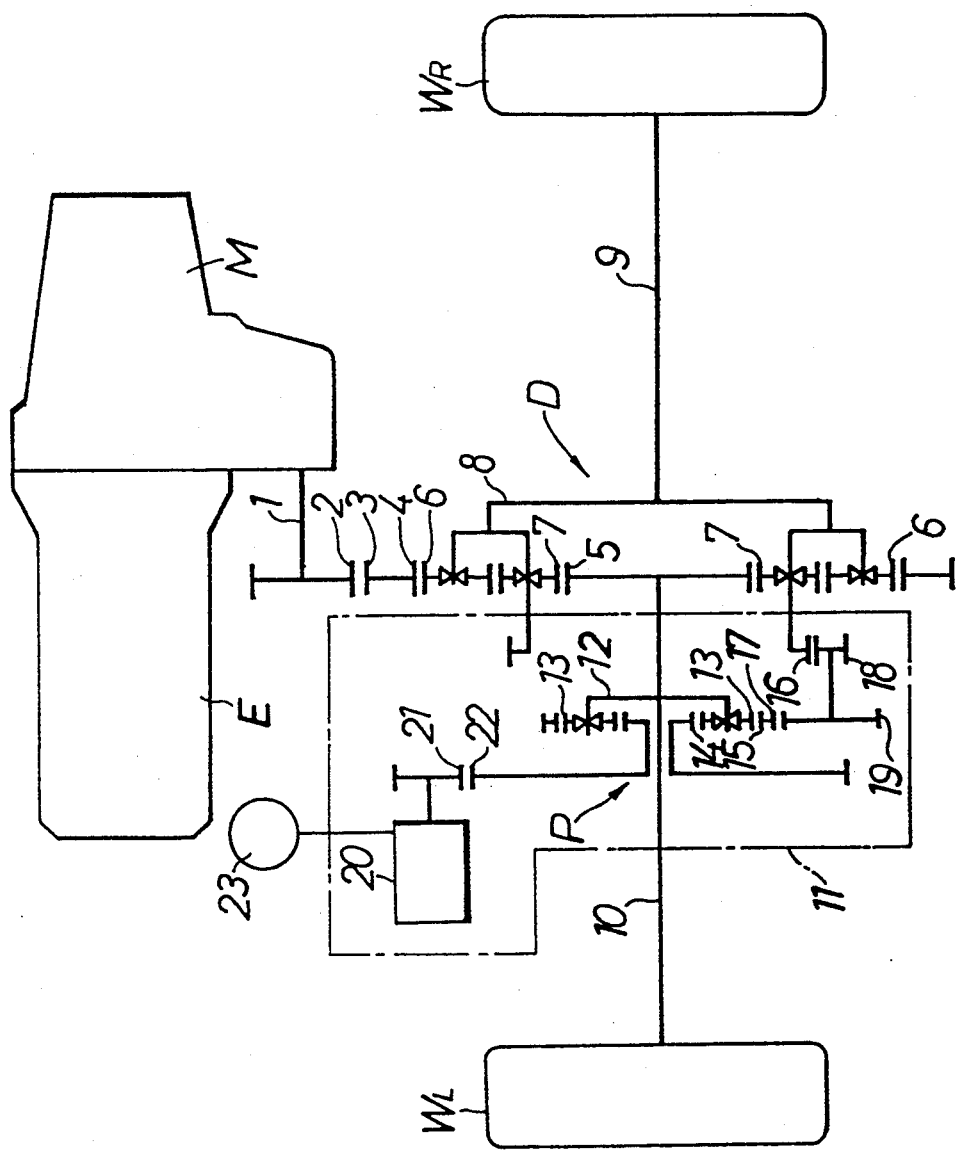
FIG. 2 is a diagram illustrating a torque distributing mechanism in a differential according to a second embodiment of the present invention.

FIG. 2 illustrates a second embodiment of the present invention. This embodiment has a feature that hydraulic motor 20 is used as a drive source for sun gear 14 of planetary gear mechanism P, and hydraulic pressure generating source 23 is connected to motor 20. Hydraulic pressure generating source 23, which can be used, may be any of a hydraulic pump driven by an electric motor, a hydraulic pump driven by the vehicle engine, a hydraulic pump in a system for transmitting power from vehicle engine E to wheels $W_R$ and $W_L$, and the like.

Figure 3:
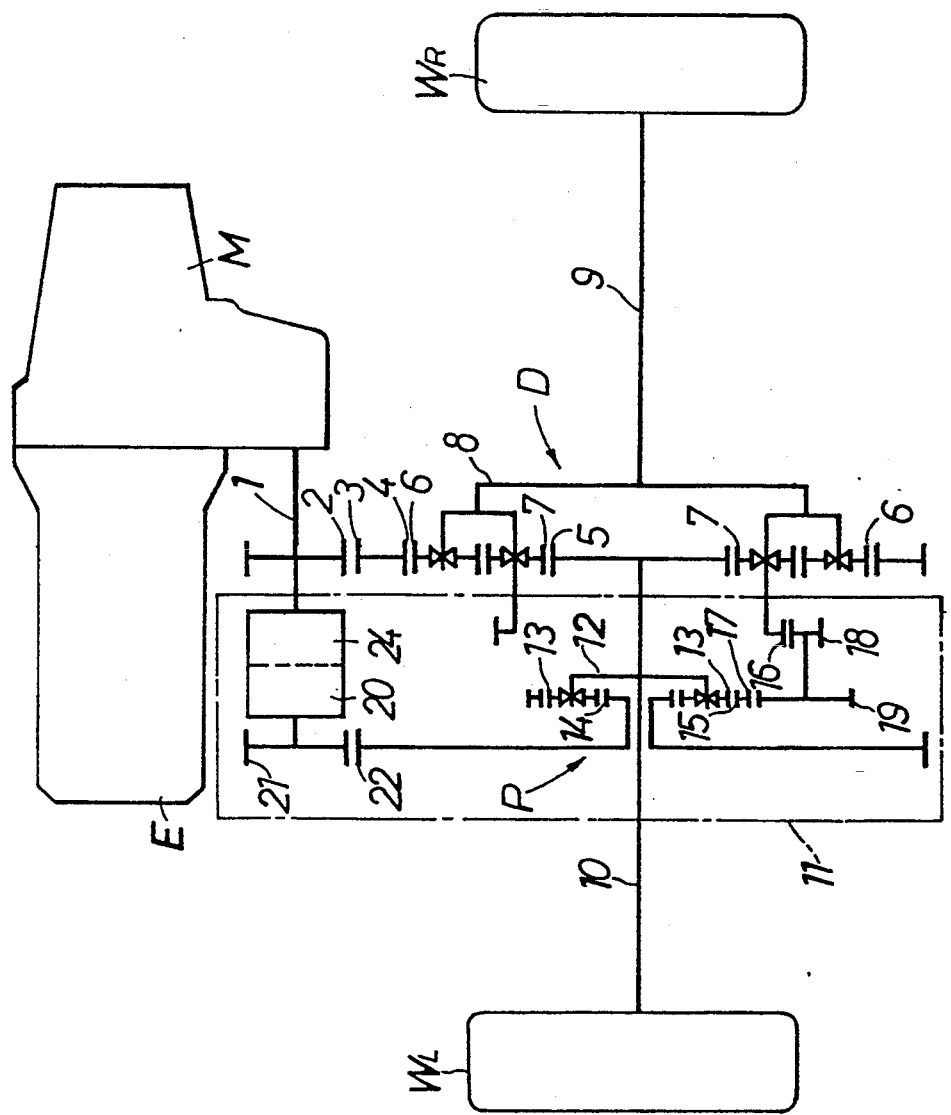
FIG. 3 is a diagram illustrating a torque distributing mechanism in a differential according to a third embodiment of the present invention.

FIG. 3 illustrates a third embodiment of the present invention. In this embodiment, hydraulic pump 24 and hydraulic motor 20 are mounted in an integral combination on differential input shaft 1 of transmission M, and at least one of hydraulic pump 24 and hydraulic motor 20 is of a variable displacement type. According to this embodiment, the rotational speed of sun gear 14 of planetary gear mechanism P is controlled by changing the displacement of hydraulic pump 24 or hydraulic motor 20.

Figure 4:
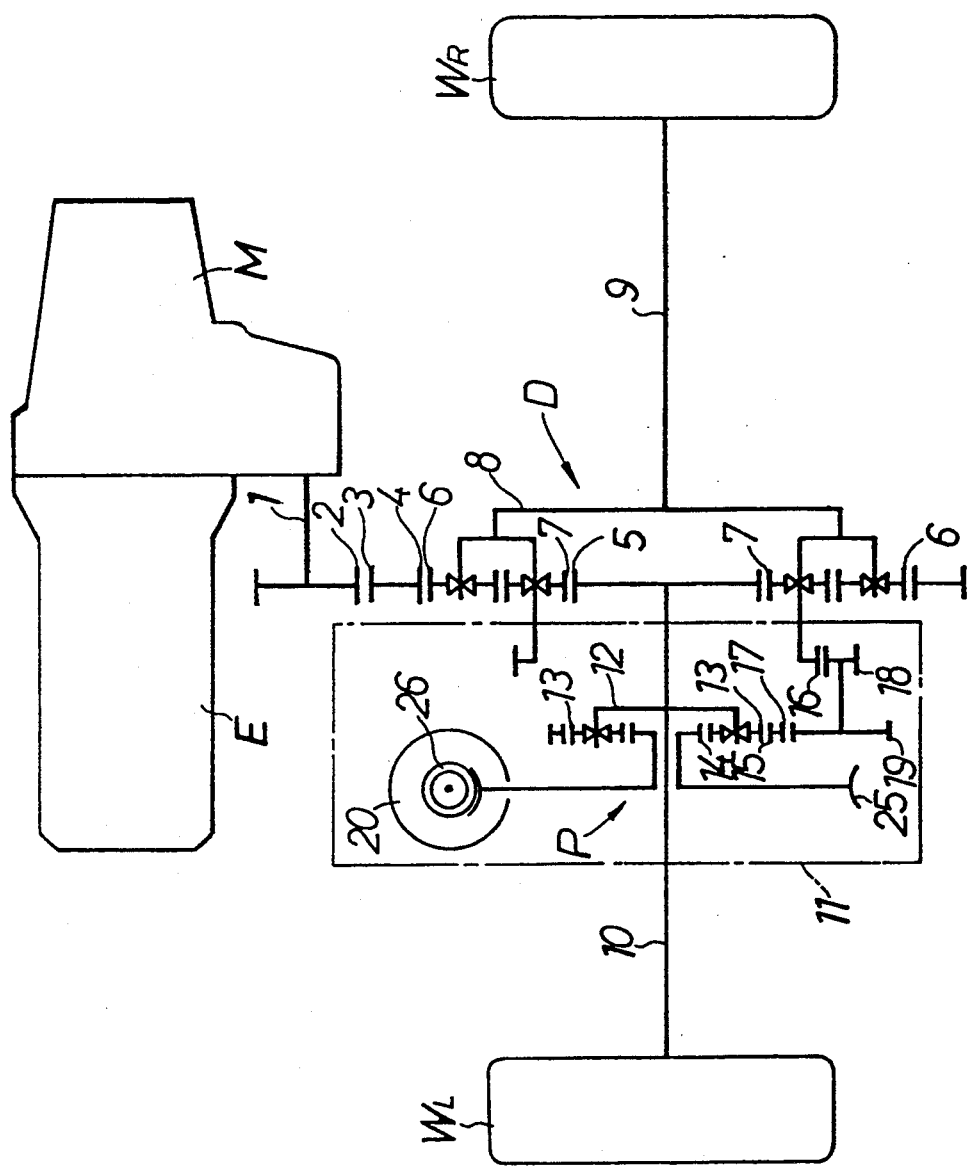
FIG. 4 is a diagram illustrating a torque distributing mechanism in a differential according to a fourth embodiment of the present invention.

FIG. 4 illustrates a fourth embodiment of the present invention. In this embodiment, the planetary gear mechanism input gear is formed by worm wheel 25, and worm gear 26 meshed with worm wheel 25 and provided on electric motor 20. According to this embodiment, the transmission of a driving force from motor 20 to planetary gear mechanism P is conducted, without any interference, by a gearing mechanism comprised of worm gear 26 and worm wheel 25, but transmission of driving force from planetary gear mechanism P to motor 20 is inhibited. Therefore, if one of right and left wheels $W_R$ and $W_L$ slips, an excessive load, applied from planetary gear mechanism P to motor 20, is received by worm gear 26. This makes it possible to provide a reduction in the size of motor 20.

Figure 5:
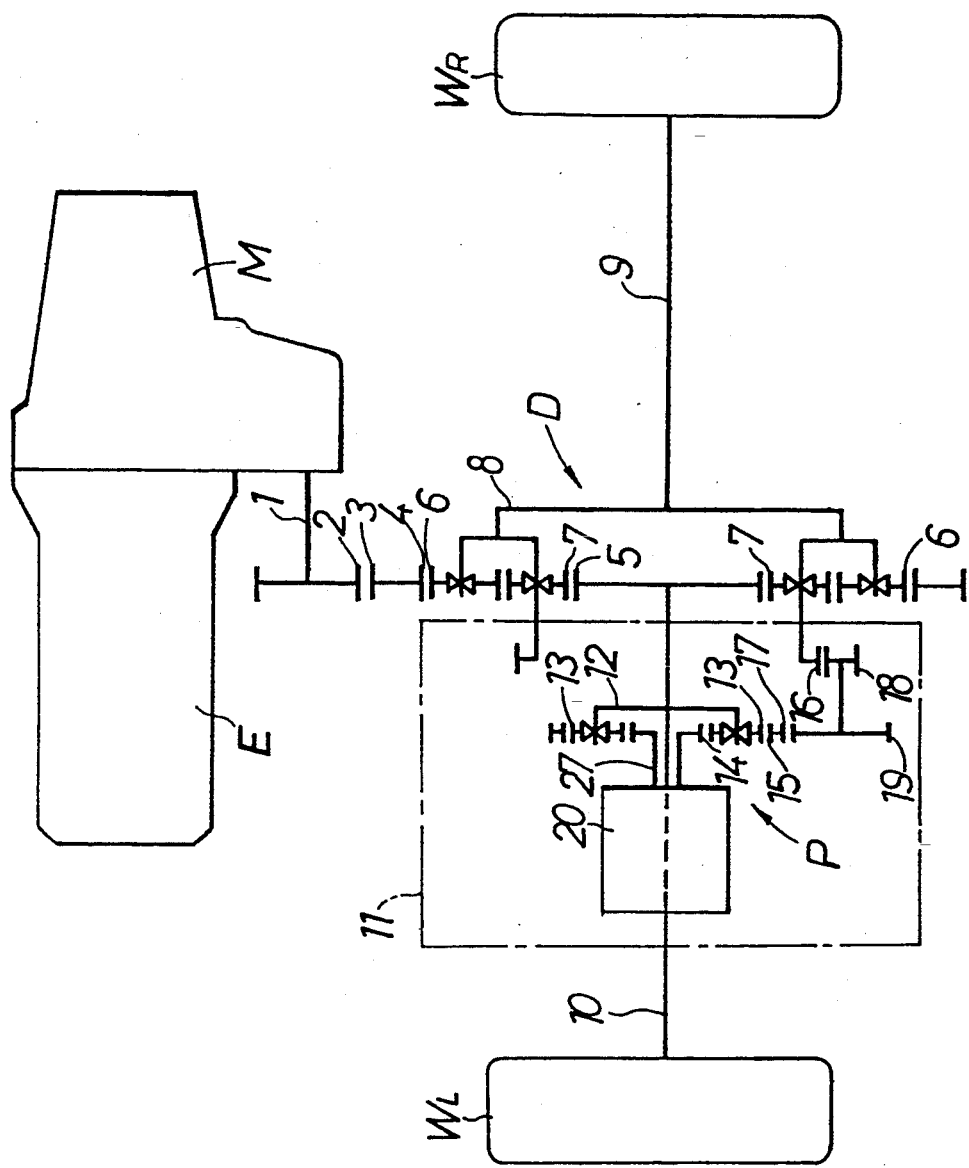
FIG. 5 is a diagram illustrating a torque distributing mechanism in a differential according to a fifth embodiment of the present invention.

FIG. 5 illustrates a fifth embodiment of the present invention. In this embodiment, sun gear 14 of planetary gear mechanism P is rotatably carried on left shaft 10 and is directly connected to output shaft 27 of motor 20 and driven thereby. To this end, output shaft 27 of motor 20 is formed into a hollow configuration, and left shaft 10 passes through output shaft 27. According to this embodiment, the radial size of torque distributing mechanism can be reduced.

Figure 6:
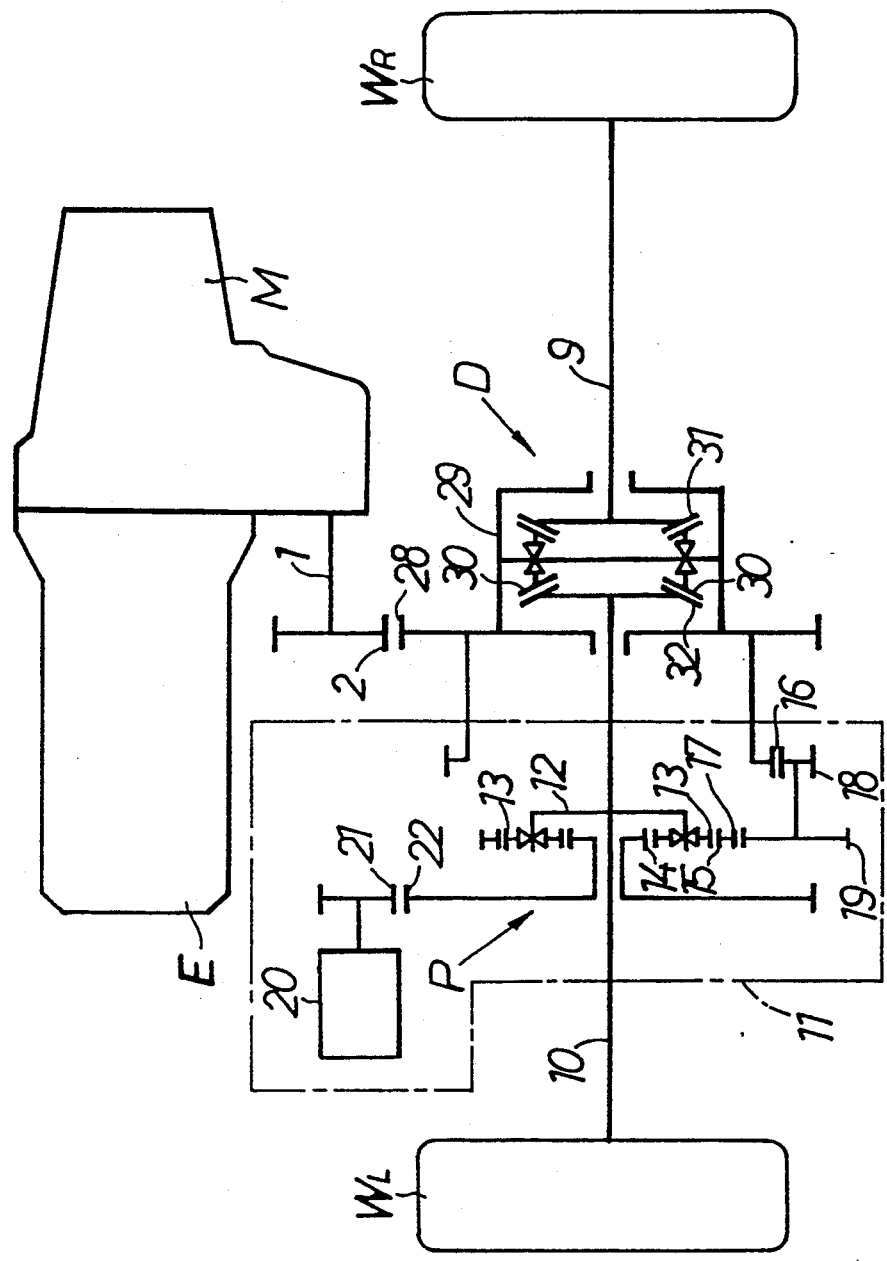
FIG. 6 is a diagram illustrating a torque distributing mechanism in a differential according to a sixth embodiment of the present invention.
Figure 7:
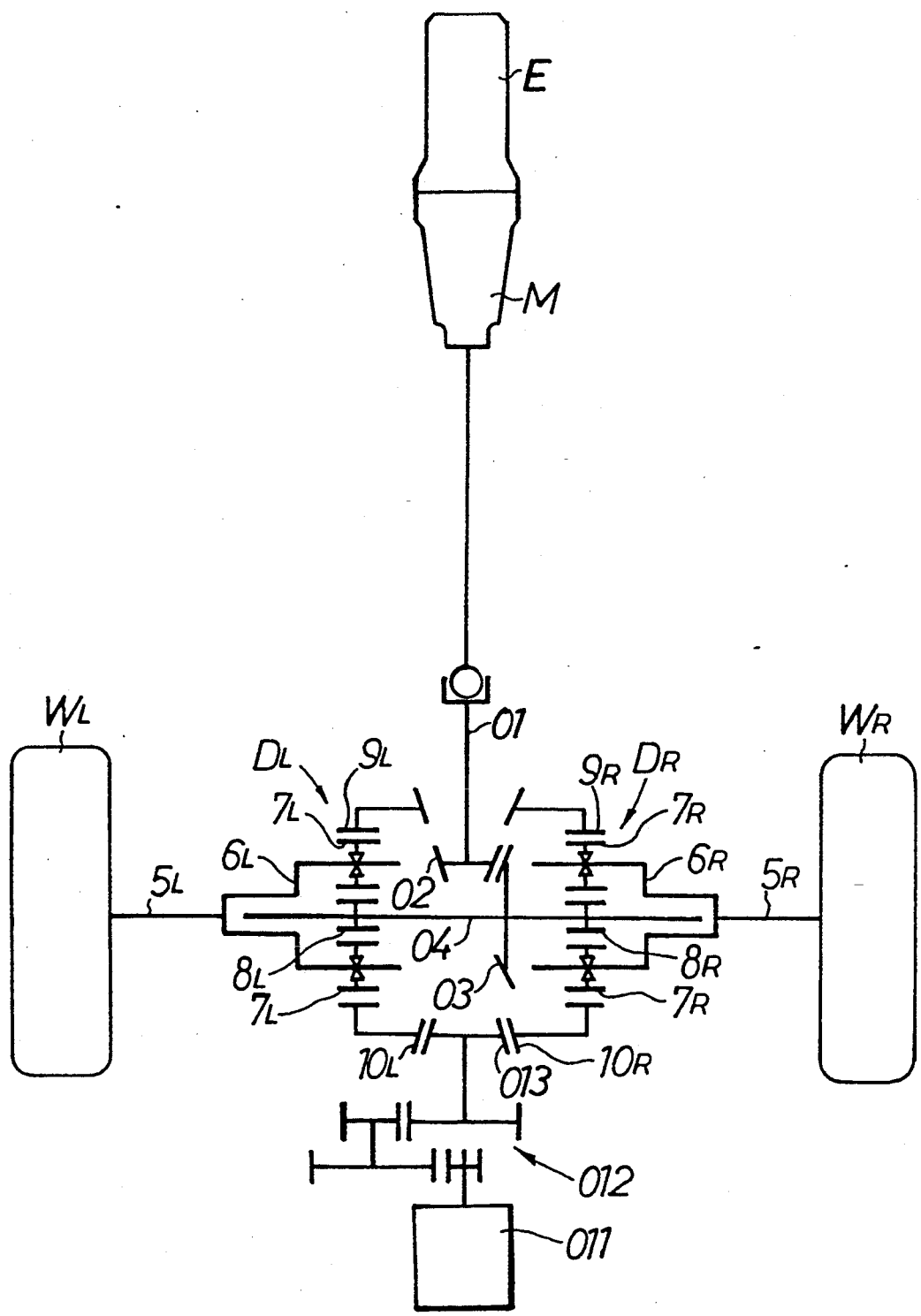
FIG. 7 is a diagram illustrating a prior art torque distributing mechanism in a differential.

FIG. 6 illustrates a sixth embodiment of the present invention. In this embodiment, a common bevel gear type differential D is used and is comprised of differential case 29, rotatably carried on right shaft 9 and left shaft 10 and having, around its outer periphery, external tooth gear 28 meshed with input gear 2, differential pinion 30, carried within differential case 29, and a pair of differential side gears 31 and 32 meshed with differential pinion 30 and coupled to right shaft 9 and left shaft 10, respectively. An external tooth gear 16, provided on differential case 29, is connected to planetary gear mechanism P, through pinions 18 and 19, as in the previously-described first embodiment. In this sixth embodiment, differential case 29 serves as an input element, and the pair of differential side gears 31 and 32 serve as output elements. Differential D and planetary gear mechanism P are interconnected by pinions 18 and 19, each comprising a spur gear. Therefore, the axial size of the torque distributing mechanism can be reduced, as compared with prior art torque distributing mechanisms using bevel gears.

Although the embodiments of the present invention have been described above, it will be understood that various minor modifications can be made without departing from the scope of the invention defined in the claims.

For example, in the planetary gear type differential D in each of the first to fifth embodiments, modifications can be made in which any of ring gear 4, sun gear 5 and planetary carrier 8 may be used as an input element or an output element. In addition, the torque distributing mechanism of the present invention is not limited to the driving system for the front wheels of a vehicle, but is applicable to a driving system for rear wheels and can be also applied to the distribution of a torque between front and rear wheels in a four-wheel drive vehicle.

What is claimed is:

1. A mechanism for distributing torque from a main drive source, comprising:
   a first differential means, including a single rotational input element and two rotational output elements, for distributing torque applied to said input clement of said differential from the main drive source to said two output elements at a predetermined proportion; and
   a second differential means including a first, a second and a third gear clement;
   wherein said first gear element is connected to a first of said two output elements, said second gear element is connected to a second of said two output elements, and said third gear element is connected to a sub-drive source.

2. A mechanism for distributing torque from a main drive source, according to claim 1, wherein said first gear element is connected to said first of said two output elements through an adjustment means for adjusting rotational speeds of said first gear element and said first output element so that a rotation of said third gear element is restrained when said output elements rotate synchronously with respect to each other.

3. A mechanism for distributing torque from a main drive source, according to claim 1, wherein said first differential means includes a ring gear, a sun gear, and a planetary carrier for carrying a planetary gear which is meshed with said ring gear and said sun gear, wherein said ring gear serves as the input element, and said sun gear and said planetary carrier serve as the output elements.

4. A mechanism for distributing torque from a main drive source, according to claim 1, wherein said second differential means includes a ring gear, a sun gear and a planetary carrier for carrying a planetary gear which is meshed with said ring gear and said sun gear, wherein said ring gear serves as the first gear element, said planetary carrier serves as the second gear element, and said sun gear serves as the third gear element.

5. A mechanism for distributing torque from a main drive source, according to claim 1, wherein said drive source is comprised of a hydraulic motor driven by a hydraulic pump which is connected to the input element, and at least one of said hydraulic pump and said hydraulic motor is of a variable displacement type.

6. A mechanism for distributing torque from a main drive source according to claim 1, wherein said sub-drive source is operatively connected to the main drive source.

7. A mechanism for distributing torque from a main drive source, comprising:

a first differential means including a single rotational input element and two rotational output elements for distributing torque applied to said input element of said differential from the main drive source to said two output elements in a predetermined proportion;

a second differential means including a first, a second and a third gear element; and wherein said first gear element is connected to said input element, said second gear element is connected to a first of said two output elements, and said third gear element is connected to a sub-drive source.

8. A mechanism for distributing torque from a main source drive according to claim 7, wherein said second differential means includes a ring gear, a sun gear, and a planetary carrier for carrying a planetary gear which is meshed with said ring gear and said sun gear, wherein said ring gear serves as the first gear element, said planetary carrier serves as the second gear element, and said sun gear serves as the third gear element.

* * * * *